United States Patent
Toda et al.

(10) Patent No.: US 8,734,680 B2
(45) Date of Patent: May 27, 2014

(54) SILICATE-BASED PHOSPHOR AND MANUFACTURING METHOD OF SILICATE-BASED PHOSPHOR

(75) Inventors: Kenji Toda, Niigata (JP); Mineo Sato, Niigata (JP); Kazuyoshi Uematsu, Niigata (JP); Tadashi Ishigaki, Niigata (JP); Hideo Suda, Tokyo (JP); Etsuko Minegishi, Tokyo (JP); Yoshiaki Kudo, Tokyo (JP)

(73) Assignees: Lead Chemical Company, Limited, Tokyo (JP); Niigata University, Niigata (JP)

( * ) Notice: Subject to any disclaimer, the term of this patent is extended or adjusted under 35 U.S.C. 154(b) by 0 days.

(21) Appl. No.: 13/640,412

(22) PCT Filed: Apr. 12, 2011

(86) PCT No.: PCT/JP2011/059090
§ 371 (c)(1),
(2), (4) Date: Oct. 10, 2012

(87) PCT Pub. No.: WO2011/129331
PCT Pub. Date: Oct. 20, 2011

(65) Prior Publication Data
US 2013/0026414 A1    Jan. 31, 2013

(30) Foreign Application Priority Data
Apr. 13, 2010  (JP) ................. 2010-092592

(51) Int. Cl.
*C01B 33/24* (2006.01)
*C09K 11/08* (2006.01)
*C09K 11/66* (2006.01)

(52) U.S. Cl.
USPC ................................. 252/301.4 F; 423/331

(58) Field of Classification Search
USPC ......... 252/301.4 F; 423/263, 325, 326, 327.1, 423/328.1, 331
See application file for complete search history.

(56) References Cited

U.S. PATENT DOCUMENTS

| 3,653,817 A * | 4/1972 | Liberman ................. 423/263 |
| 2007/0221884 A1 * | 9/2007 | Hoppe et al. .............. 252/301.28 |
| 2010/0201250 A1 | 8/2010 | Winkler et al. |

FOREIGN PATENT DOCUMENTS

| JP | 2001-303039 A | 10/2001 |
| JP | 2004-161982 A | 6/2004 |

(Continued)

OTHER PUBLICATIONS

Kang. The enhancement of photoluminescence characteristics of Eu-doped barium strontium silicate phosphor particles by co-doping materials. Journal of Alloys and Compounds 402 (2005) 246-250.*

(Continued)

*Primary Examiner* — Carol M Koslow
*Assistant Examiner* — Matthew E Hoban
(74) *Attorney, Agent, or Firm* — Kubotera & Associates, LLC

(57) ABSTRACT

There are provide a silicate-based phosphor excellent in emission intensity and a manufacturing method of the same. A manufacturing method of a silicate-based phosphor is characterized by: introducing in a vessel raw material powders having a compound containing light-emitting ions selected from at least one of Eu, Ce, Mn, and Tb; and firing the raw material powders while supplying $SiO_x$ ($0.5 \leq x \leq 1.9$, preferably, $0.8 \leq x \leq 1.2$) in a gas phase. The raw material powders preferably further contains at least one of an alkali metal compound, an alkaline-earth metal compound, a magnesium compound, and a rare-earth compound. The silicate-based phosphor is preferably $M_2SiO_4:Eu^{2+}$ (wherein M is one or more selected from a group consisting of Ca, Sr and Ba). The firing is preferably performed by supplying the $SiO_x$ to the raw material powders in a gas atmosphere at a temperature of 1200 to 1700° C. and subjecting the raw material powders to a gas-solid phase reaction at a temperature of 700 to 1700° C.

4 Claims, 13 Drawing Sheets

(56) References Cited

FOREIGN PATENT DOCUMENTS

| JP | 2007-009141 A | 1/2007 |
| WO | 2003/080763 A1 | 10/2003 |
| WO | 2004/111156 A1 | 12/2004 |
| WO | 2008/122332 A1 | 10/2008 |

OTHER PUBLICATIONS

Satoshi Watanabe "Present Status and Application of InGaN-based high-power LED" Applied Physics, vol. 74, No. 11, Nov. 2005, pp. 1437-1442.

"Phosphor Handbook" edited under the auspices of Phosphor Research Society, Ohmsha, Ltd., Jun. 20, 1991, pp. 219-223.

T. L. Barry, "Fluorescence of Eu2+-Activated Phases in Binary Alkaline Earth Orthosilicate Systems" J. Electrochem. Soc., 115, Nov. 1968, pp. 1181-84.

K. Toda et al. "Artarasii Kisoho ni yoru Keisan'en Keikotai no Gosei", Japan Electronic Materials Society 47th Shuki Koen Taikai, Koen Gaiyoshu, Nov. 19, 2010, p. 01.

K.Toda et al. "Kokisoho ni yoru Keisan'en Keikotai no Gosei" 71st Extended abstracts, The Japan Society of Applied Physics, Aug. 30, 2010, Ronbun No. 14a-ZM-7.

\* cited by examiner (a)

(b)

(a)

(b)

SILICATE-BASED PHOSPHOR AND MANUFACTURING METHOD OF SILICATE-BASED PHOSPHOR

TECHNICAL FIELD

The present invention relates to a silicate-based phosphor and a manufacturing method of the silicate-based phosphor and, more specifically, to a silicate-based phosphor using a gas phase reaction of $SiO_x$ ($0.5 \leq x \leq 1.9$) and a manufacturing method of the silicate-based phosphor.

BACKGROUND ART

At present, various illumination light sources such as an incandescent lamp, a fluorescent lamp and so on are used around us. Recently, a white LED, having a combination of characteristics such as low power consumption, long life, safety and so on, gets a lot of attention as an alternative illumination to the incandescent lamp or the fluorescent lamp. Further, a phosphor used in the white LED is also required to have higher performance regarding the emission efficiency and durability.

White LEDs are roughly classified into two types in terms of a method for producing a white color, and among them, the two-wavelength white LED that is the mainstream at present obtains a pseudo white color by using both an GaInN-based blue LED and a yellow phosphor $YAG:Ce^{3+}(Y_3Al_5O_{12}:Ce^{3+})$ but is not excellent in color rendering property, and thus cannot emit white light close to the natural light (see Non-Patent Document 1).

On the other hand, there exists a three-wavelength white LED excitable with near-ultraviolet light or blue light and emitting white light closer to the natural light. For example, many silicate-based phosphors excite with near-ultraviolet light or blue light and emit visible light and are thus regarded as promising three-wavelength white LED phosphors, but none of them has a high luminance at a practical level (see Non-Patent Documents 2, 3).

PRIOR ART DOCUMENT

Non-Patent Document

Non-Patent Document 1: Satoshi Watanabe "Present Status and Application of InGaN-based high-power LED" Applied Physics, Vol. 74, No. 11, 2005

Non-Patent Document 2: "Phosphor Handbook" edited under the auspices of Phosphor Research Society, Ohmsha, Ltd., 1991

Non-Patent Document 3: T. L. Barry, J. Electrochem. Soc., 115, (1968)

DISCLOSURE OF THE INVENTION

Problems to be Solved by the Invention

Hence, in consideration of the above-mentioned circumstances, an object of the present invention is to provide a silicate-based phosphor excellent in emission intensity and a manufacturing method of the silicate-based phosphor.

Conventionally, as a general manufacturing method of the silicate-based phosphor, a method for obtaining a phosphor by mixing predetermined amounts of a compound containing elements constituting the phosphor host and a compound containing an activator element, both compounds in a solid state such as powder or the like, and firing the mixture at a predetermined temperature is widely used (see Non-Patent Document 2). This synthesis method is realized by the solid-solid phase reaction and is thus called a solid phase method.

However, it is difficult for the solid-solid phase method to manufacture the phosphor purely having a composition according to stoichiometry and to obtain a highly-pure phosphor according to stoichiometry because excessive nonreactive impurities or complex oxide produced by the reaction remains as a result of the solid-solid phase reaction. Consequently, problems such as the aforementioned decrease in luminance of the phosphor and so on are pointed out.

The present inventors found that the phosphor may be synthesized using $SiO_x$ in the gas phase which is not usually used in the phosphor manufacturing field (a method for causing volatilized $SiO_x$ to react with other solid phase materials to synthesize the phosphor, also called a "gas-solid phase method"), and that the phosphor obtained using the gas-solid phase method may have better emission characteristics than those of the phosphor obtained by the conventional solid phase method, and reached completion of the present invention.

Means for Solving the Problems

More specifically, the present invention includes the following compositions and characteristics.

[1] A manufacturing method of a silicate-based phosphor, including: introducing in a vessel raw material powders having a compound containing light-emitting ions selected from at least one of Eu, Ce, Mn, and Tb; and firing the raw material powders while supplying $SiO_x$ ($0.5 \leq x \leq 1.9$) in a gas phase.

[2] The manufacturing method of a silicate-based phosphor according to [1] wherein the raw material powders are a mixture further containing at least one of an alkali metal compound, an alkaline-earth metal compound, a magnesium compound, and a rare-earth compound.

[3] The manufacturing method of a silicate-based phosphor according to [2] wherein the silicate-based phosphor is $M_2SiO_4:Eu^{2+}$ (wherein M is one or more selected from a group consisting of Ca, Sr and Ba).

[4] The manufacturing method of a silicate-based phosphor according to any one of [1] to [3] wherein the range for x of the $SiO_x$ is $0.8 \leq x \leq 1.2$.

[5] The manufacturing method of a silicate-based phosphor according to any one of [1] to [4] wherein the firing is performed by supplying the $SiO_x$ to the raw material powders in a gas atmosphere at a temperature of 1200 to 1700° C. and subjecting the raw material powders to a gas-solid phase reaction at a temperature of 700 to 1700° C.

[6] The manufacturing method of a silicate-based phosphor according to [5] wherein the gas atmosphere is a reducing gas atmosphere.

[7] A silicate-based phosphor manufactured by the manufacturing method of a silicate-based phosphor according to any one of [1] to [6].

Effect of the Invention

The present invention can provide a phosphor having better fluorescence characteristics than those of the phosphor obtained by the conventional solid phase method because of use of the gas phase synthesis at a part of the phosphor manufacturing processes. For example, in comparison between the example of $Ba_2SiO_4:Eu^{2+}$ and the comparative example synthesized by the conventional method, the phosphor of the example exhibited the emission intensity of about 2.6 times higher than the emission intensity of the phosphor of the comparative example when they were excited at respective optimal excitation wavelengths and about 3.5 times higher when they were excited by a practical near-ultraviolet LED (405 nm), and therefore exhibited very high intensity as compared to the phosphor manufactured by the conventional method.

BEST MODE FOR CARRYING OUT THE INVENTION

Figure 1:
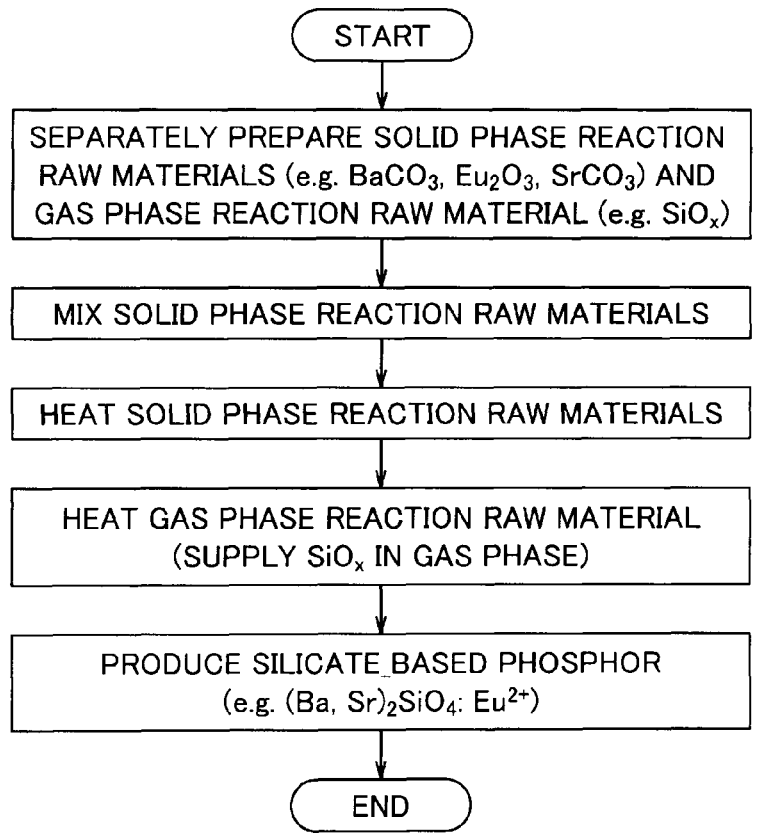
[FIG. 1] A flowchart of a preferable manufacturing method of a silicate-based phosphor of the present invention.

Hereinafter, the present invention will be described based on the following concrete embodiments referring to the accompanying drawings, but the present invention is not limited to the embodiments.

A manufacturing method of a silicate-based phosphor according to the present invention includes: introducing in a vessel raw material powders having a compound containing light-emitting ions selected from at least one of Eu, Ce, Mn, and Tb; and firing the raw material powders while supplying $SiO_x$ ($0.5 \leq x \leq 1.9$) in a gas phase. In addition, it is preferable that the raw material powders are a mixture further containing at least one of an alkali metal compound, an alkaline-earth metal compound, a magnesium compound, and a rare-earth compound.

Here, as the compound containing the light-emitting ions, though not particularly limited, a compound containing Eu such as $Eu_2O_3$, $Eu_2(CO_3)_3 \cdot 2H_2O$, $Eu(NO_3)_3 \cdot 6H_2O$, $Eu_2(C_2O_4)_3 \cdot 10H_2O$ or the like, a compound containing Ce such as $Ce_2O_3$, $Ce_2(CO_3)_3 \cdot 5H_2O$, $Ce(NO_3)_3 \cdot 5H_2O$, $Ce_2(C_2O_4)_3 \cdot 9H_2O$, $Ce_2(C_2O_4)_3 \cdot 10H_2O$ or the like, a compound containing Mn such as $MnO$, $MnCO_3$, $Mn(NO_3)_2 \cdot 6H_2O$, $Mn(C_2O_4)$, $Mn(C_2O_4)_3 \cdot 2H_2O$ or the like, a compound containing Tb such as $Tb_2O_3$, $Tb_2(CO_3) \cdot nH_2O$, $Tb(NO_3)_3 \cdot 6H_2O$, $Tb(C_2O_4)_3 \cdot 10H_2O$ or the like, and a combination thereof are preferably used. Further, though not included in the compound containing the light-emitting ions in a precise sense, $CeO_2$ or $Tb_4O_7$ exhibiting the physical property similar to that of aforementioned $Ce_2O_3$ or $Tb_2O_3$ may be used.

Further, as the alkali metal compound, though not particularly limited, $Li_2O$, $Li_2CO_3$, $LiNO_3$, $Li_2C_2O_4$, $Na_2O$, $Na_2CO_3$, $NaNO_3$, $Na_2C_2O_4$, $K_2O$, $K_2CO_3$, $KNO_3$, $Rb_2O$, $Rb_2CO_3$, $RbNO_3$, $Cs_2O$, $Cs_2CO_3$, $CsNO_3$, $Cs_2C_2O_4$, and a combination thereof are used, and the compound, which can be decomposed and oxidized into an oxide at a high temperature, is preferably used.

Further, as the alkaline-earth metal compound, though not particularly limited, $CaO$, $CaCO_3$, $Ca(NO_3)_2$, $Ca(NO_3)_2 \cdot 4H_2O$, $SrO$, $SrCO_3$, $Sr(NO_3)_2$, $Sr(NO_3)_2 \cdot 4H_2O$, $BaO$, $BaCO_3$, $Ba(NO_3)_2$, $BaC_2O_4$, and a combination thereof are used, and the compound, which can be decomposed and oxidized into an oxide at a high temperature, is preferably used.

Further, a magnesium compound containing divalent Mg, that is equivalent to the alkaline-earth metal compound, can also be used in place of the alkaline-earth metal compound. Further, as the rare-earth compound, though not particularly limited, $Sc_2O_3$, $Y_2O_3$, $La_2O_3$, and a combination thereof are used, and the compound, which can be decomposed and oxidized into an oxide at a high temperature, is preferably used.

In the present invention, by maintaining a raw material mixture preferably containing at least one of the above-described alkali metal compound, alkaline-earth metal compound, magnesium compound, and rare-earth compound, for example, in a temperature range of 700° C. to 1700° C. for 1 to 100 hours to fire the raw material mixture, and further supplying thereto $SiO_x$, which has become gaseous in a gas atmosphere at a temperature of 1200° C. to 1700° C. to cause a gas-solid phase reaction of the raw material mixture, a phosphor very excellent in emission characteristics is obtained.

Note that when the above-described metal compound contains hydrate, hydroxide, carbonate, nitrate, oxalate which can be decomposed and/or oxidized into an oxide at a high temperature, it is also possible to make the raw material mixture into an oxide, for example, by previously calcining it at a temperature lower than the firing temperature, or make the raw material mixture into a precursor of the phosphor by removing crystallization water therefrom. Further, it is also possible to grind the raw material mixture after the pre-calcination.

A flowchart of a preferable manufacturing method among the methods for manufacturing a silicate-based phosphor of the present invention is illustrated in FIG. 1. As starting materials, raw materials for causing a solid phase reaction (solid phase reaction raw materials) and a raw material for causing a gas phase reaction (gas phase reaction raw material) are separately prepared (for example, put on separate dishes in a reaction vessel). Then, through mixing and heating of the solid phase reaction raw materials and heating of the gas phase reaction raw material, a desired silicate-based phosphor is manufactured. Here, the heating temperature (firing temperature) range for the solid phase reaction raw materials is preferably in a range of 700° C. to 1700° C., and the heating temperature range for the gas phase reaction raw material for supplying $SiO_x$ is preferably in a range of 1200° C. to 1700°

C. Note that from a later-described demonstration result, in the case of using $Ba_2SiO_4$:$Eu^{2+}$ as the silicate-based phosphor of the present invention, the firing temperature is more preferably set to 1400° C. to 1600° C.

One of important features of the present invention is that raw material powders (solid phase reaction raw materials) are fired while supplying $SiO_x$ ($0.5 \leq x \leq 1.9$) in a gas phase (namely, that a part of the starting materials (gas phase reaction raw material) is heated to cause a gas is phase reaction, and the solid phase reactant is fired while the gas phase reactant is reacted with the solid phase reactant, in other words, that a gas-solid phase reaction is caused), that is greatly different from a general solid phase synthesis (namely, all of the starting materials are solid-phase synthesized) used in conventional phosphor manufacturing methods.

Note that the conventional gas phase synthesis is a synthesis method applied to processes for producing a nanoparticle of about 1 to 100 nm. In contract, for manufacturing a phosphor for the white LED, it is required to obtain large particles grown to about 10 to 100 μm, and therefore the above-described solid phase method has been the suitable and time-proven method. Accordingly, researchers in a field for manufacturing the phosphors, in general, are less likely to understand or reach the way of thinking to employ the gas phase synthesis, suitable for the manufacture of nano-order particles, into the manufacture of phosphors. Furthermore, the gas phase raw material used in the conventional gas phase method is an expensive material such as an organic metal compound, and is not the kind handled in a reducing atmosphere gas in manufacturing phosphors, and therefore there is no example reporting practical characteristics for phosphors, obtained by applying the way of thinking of the gas phase synthesis to the manufacture of phosphor. On the other hand, the manufacturing method of the present invention is characterized by the gas-solid phase synthesis of causing $SiO_x$ in a gas phase to react with the other raw material in a solid phase.

In the manufacturing method of the present invention, $SiO_x$ ($0.5 \leq x \leq 1.9$) that is a raw material for synthesis in a gas phase is a material inexpensive and safe to handle. Note that the general manufacturing method of $SiO_x$ is performed by heating a mixture of a silicon-dioxide-based oxide powder and a substance reducing the powder, for example, silicon metal in an inert gas atmosphere or under a reduced pressure in a temperature range of 1100 to 1600° C., and cooling and collecting the generated $SiO_x$ gas. However, unreacted substance (Si, $SiO_2$) or $SiO_2$ generated by oxidization of SiO sometimes exist as impurities in the $SiO_x$.

The verification by the inventors until now shows that since $SiO_x$ when it is closer to SiO more suitably acts, the range for x of $SiO_x$ preferably falls within $0.8 \leq x \leq 1.2$, and more preferably, $0.95 \leq x \leq 1.1$. Such a suitable high-purity SiO is commercially available from, for example, OSAKA Titanium technologies Co., Ltd. and Sanyo Trading Co., Ltd.

$SiO_x$ in the solid state can be volatile and be in the gas phase by being heated in a gas atmosphere at 1200 to 1700° C., preferably, at 1400 to 1700° C. into a gas phase. The $SiO_x$ in the gas phase is supplied to the raw material mixture and heated at a desired temperature in the temperature range of 700° C. to 1700° C. to cause gas-solid phase reaction.

Examples of the gas atmosphere include (1) an inert gas atmosphere composed of nitrogen, argon or the like, (2) an oxidized gas atmosphere composed of air, oxygen, oxygen-containing nitrogen, oxygen-containing argon or the like, and (3) a reducing gas atmosphere such as hydrogen-containing nitrogen containing 0.1 to 10 volume % hydrogen, hydrogen-containing argon containing 0.1 to 10 volume % hydrogen or the like. Note that to promote the gas-solid phase reaction of the present invention at a high yield, the carrier gas to supply $SiO_x$ and the atmosphere during firing is particularly preferably a reducing atmosphere such as hydrogen-containing nitrogen containing 0.1 to 10 volume % hydrogen, hydrogen-containing argon containing 0.1 to 10 volume % hydrogen or the like.

Though the silicate-based phosphor of the present invention manufactured as described above is not particularly limited as long as it is synthesized by the above-described manufacturing method, $M_2SiO_4$:$Eu^{2+}$, $Li_2MSiO_4$:$Eu^{2+}$, $M_3SiO_5$:$Eu^{2+}$, $M_2(Mg, Zn)Si_2O_7$:$Eu^{2+}$, $M_3Si_2O_7$:$Eu^{2+}$, $M_3MgSi_2O_8$:$Eu^{2+}$, $MAl_2Si_2O_8$:$Eu^{2+}$, $M_3Sc_2Si_3O_{12}$:$Ce^{3+}$, $M_9Sc_2Si_6O_{24}$:$Eu^{2+}$, and a combination thereof are preferable. Here, M is one or more selected from a group consisting of Ca, Sr and Ba. Note that from the viewpoint of practical use of the phosphor based on various characteristics other than the emission characteristics, $M_2SiO_4$:$Eu^{2+}$ is preferable as the silicate-based phosphor of the present invention, and $(Ba_{1-y}Sr_y)_2SiO_4$:$Eu^{2+}$ ($0 \leq y \leq 1$) is more preferable.

Note that the starting materials for manufacturing $(Ba_{1-y}Sr_y)_2SiO_4$:$Eu^{2+}$ ($0 \leq y \leq 1$) and the materials (the starting materials except $SiO_x$, for example, $BaCO_3$) undergoing a solid phase reaction are well solid-phase synthesized in the temperature range (1200 to 1700° C.) suitable for the gas phase synthesis of $SiO_x$, so that by heating the phosphor manufacturing vessel in the aforementioned preferable temperature range, volatilization of $SiO_x$ and the solid phase synthesis (namely, firing) can be effectively performed at the same time.

Figure 2:
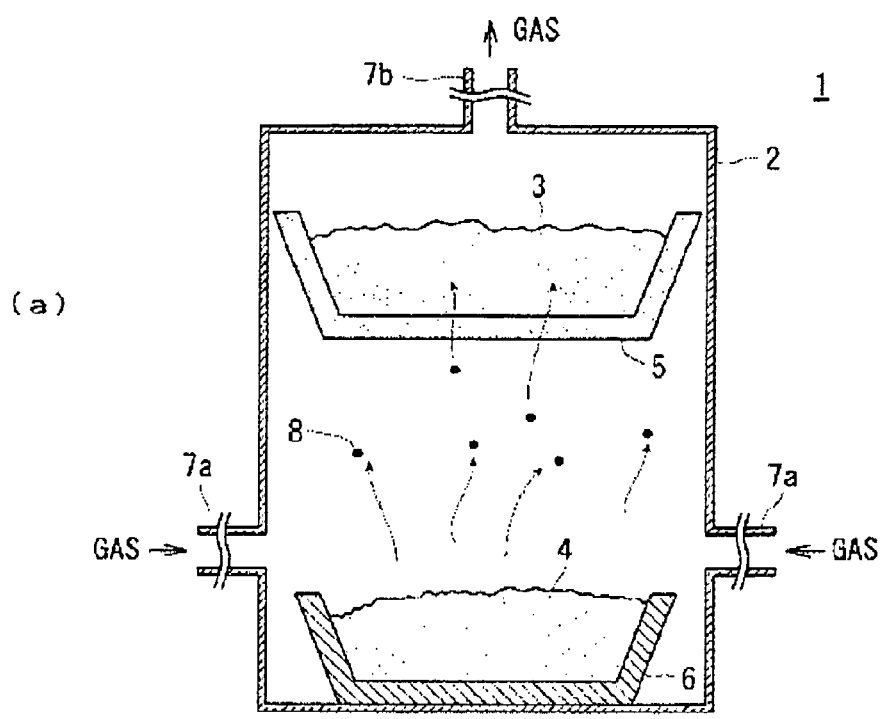
[FIG. 2] A view illustrating schematics of manufacturing apparatuses realizing a manufacturing method of a silicate-based phosphor of the present invention.
Figure 2:
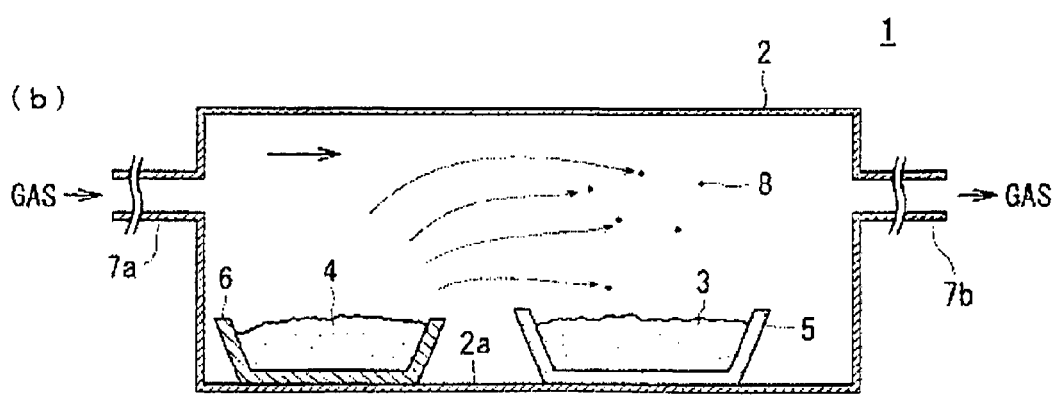

Some examples of phosphor manufacturing apparatuses 1 realizing the manufacturing method of the silicate-based phosphor of the present invention are illustrated in FIG. 2. The manufacturing apparatus 1 illustrated in FIG. 2(a) is configured such that a gas permeable (for example, porous) first dish 5 on which raw material powders 3 (namely, the solid phase reaction raw materials) containing a compound containing the light-emitting ions are put is provided inside a vessel 2, a second dish 6 on which $SiO_x$ powders 4 (namely, the gas phase reaction raw materials) are put, is provided below the first dish 5, and gas supply ports 7a, through which a carrier gas is supplied, and a gas exhaust port 7b are provided in side surfaces and an upper surface of the vessel 2 respectively (called a vertical manufacturing apparatus for comparison to later-described FIG. 2(b)). By heating the inside of the vessel 2 at a predetermined temperature, the solid phase reaction raw materials 3 are fired, and a firing reaction proceeds while $SiO_x$ in the gas phase (indicated with a numeral 8 in the drawing) volatilized from the $SiO_x$ powders 4 in the gas atmosphere (preferably, in a reducing gas atmosphere) is passing through the first dish 5 and entering the raw material powders 3. Note that examples of the materials of the first dish 5 for containing the solid phase reaction raw material powders include, for example, boron nitride (BN), alumina ($Al_2O_3$), and silicon carbide (SiC), and however, boron nitride (BN) is preferable, since it is unlikely to cause reaction with the raw material powders during firing. Further, though not illustrated, the vertical manufacturing apparatus may be configured such that the second dish 6 may be introduced in another vessel and $SiO_x$ in the gas phase may be supplied together with the carrier gas to the solid phase reaction raw material powders 3 from the gas supply ports 7a.

Further, as illustrated in FIG. 2(b), a horizontally configured manufacturing apparatus 1 may be used which is configured such that the first dish 5, on which the raw material powders 3 are put, and the second dish 6, on which the $SiO_x$ powders 4 are put, are set on the same horizontal plane 2a in the vessel 2, and the supply port 7a and the exhaust port 7b for the carrier gas are provided in side surfaces of the vessel 2 so that the carrier gas flows from the second dish 6 to the first dish 5 (see arrows in the drawing). Note that in this case, since $SiO_x$ (see the numeral 8) moves along the flow of the carrier gas from a space above the second dish 6 to a space above the first dish 5 and showers on the raw material powders 3 in the first dish 5, the first dish 5 does not always need to be made of a gas permeable material.

EXAMPLE 1

(Silicate-based Phosphor of Example 1: $Ba_2SiO_4:Eu^{2+}$)

Figure 3:
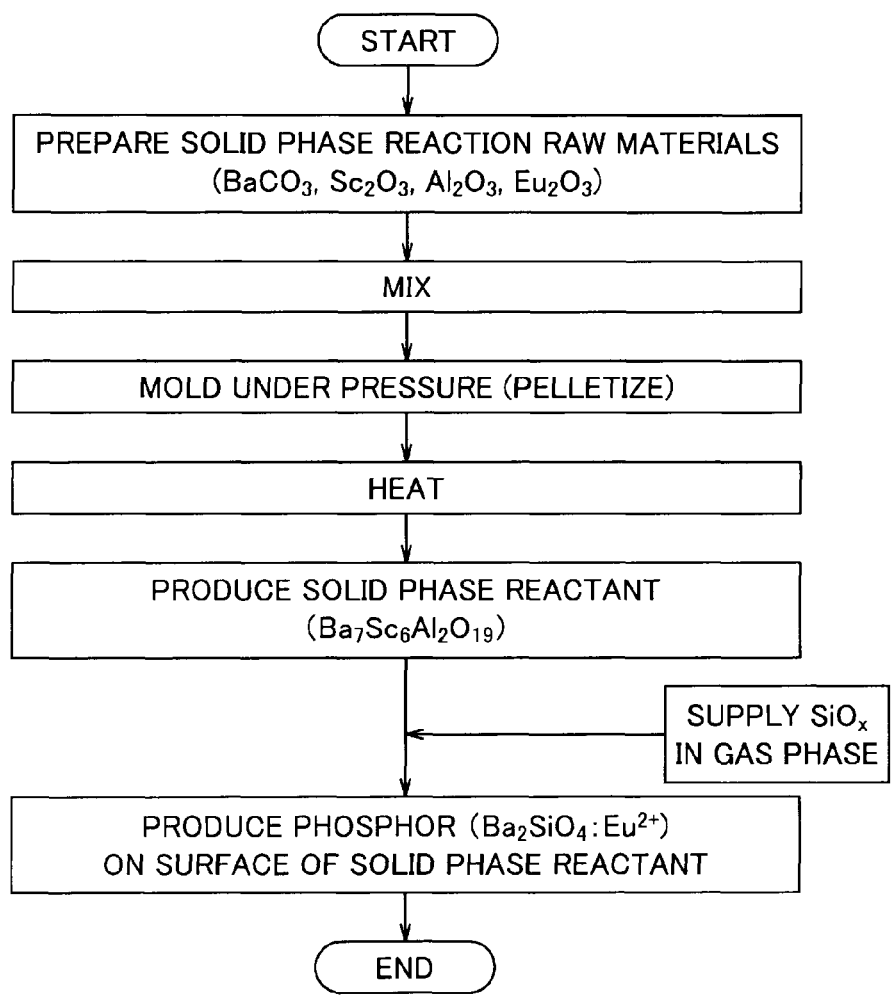
[FIG. 3] A flowchart of a manufacturing method of Example 1.

The silicate-based phosphor of Example 1 was manufactured by the gas-solid phase synthesis method of the present invention. Note that a flowchart of the manufacturing method of Example 1 is illustrated in FIG. 3. As the solid phase reaction raw materials of the starting materials, $BaCO_3$ (Kanto Chemical Co., Ltd., 3N), $Sc_2O_3$ (Shin-Etsu Chemical Co., Ltd., 4N), $Al_2O_3$ (Kojundo Chemical Laboratory, 4N), and $Eu_2O_3$ (Shin-Etsu Chemical Co., Ltd., 4N) were used. The materials were each weighed out according to the stoichiometry and subjected to acetone wet-mixing in an agate mortar. After the mixing, the resultant material was molded under pressure into a pellet shape, then the dried sample was put on the first dish (alumina boat) in the vessel, and $SiO_x$ ($0.95 \leq x \leq 1.1$) was heated to and volatilized at 1500° C. and supplied and the phosphor material was fired for 12 hours in a reducing gas atmosphere composed of an argon gas containing 5 vol. % hydrogen gas to thereby perform a gas-solid phase reaction.

As a result, a solid phase reactant having $(Ba_{0.99}Eu_{0.01})_7Sc_6Al_2O_{19}$ as a main phase was obtained by the solid phase reaction in the starting materials, and $Ba_2SiO_4:Eu^{2+}$ was generated with a high yield on a surface of the solid phase reactant by the gas-solid phase reaction between $SiO_x$ supplied into the vessel and the starting materials.

(Identification of Sample)

Figure 4:
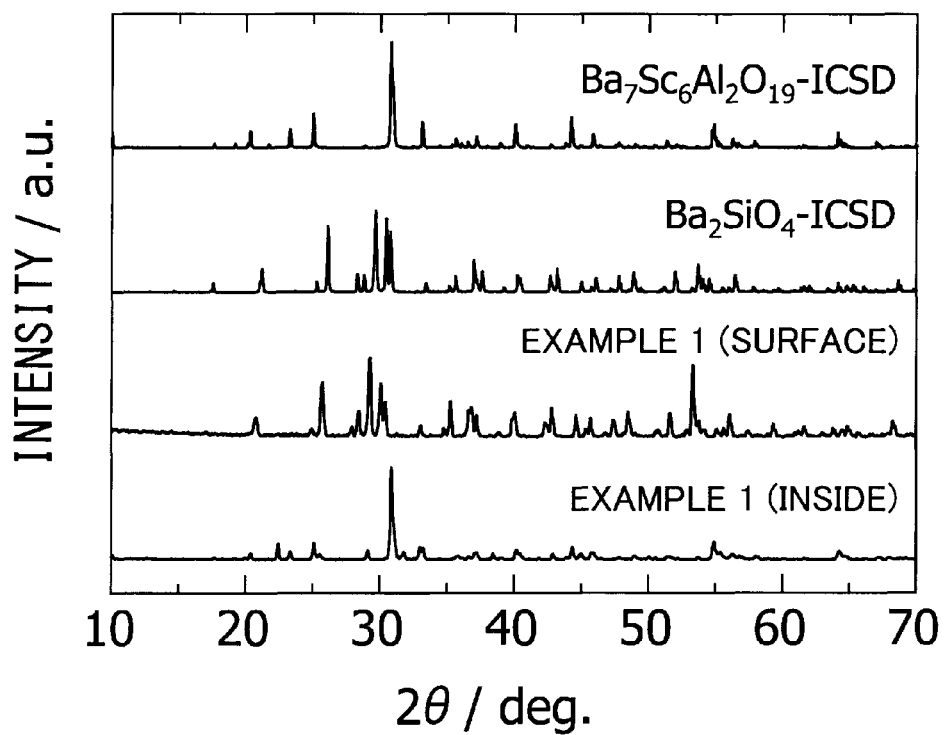
[FIG. 4] A graph showing X-ray diffraction (XRD) measurement results of $Ba_2SiO_4:Eu^{2+}$ manufactured by Example 1.

For identification of the sample after the firing, a powder X-ray diffractometer (manufactured by Mac Science Ltd., MX-Labo) was used. FIG. 4 shows X-ray diffraction (XRD) measurement results of a sample manufactured by Example 1. Here, the results at the lowermost stage and an upper stage thereof present XRD patterns of the inside and the surface, respectively, of the sample (Example 1). On the other hand, the results at the uppermost stage and a lower stage thereof present XRD patterns of $(Ba_{0.99}Eu_{0.01})_7Sc_6Al_2O_{19}$ and $Ba_2SiO_4$, respectively, acquired from an inorganic crystal structure database (ICSD) provided by Japan Association for International Chemical Information (JAICI).

The XRD patterns at the lowermost stage and the upper stage thereof well coincided with and corresponded to the XRD patterns at the uppermost stage and the lower stage thereof, which were used as specimens. Therefore, it is endorsed that $(Ba_{0.99}Eu_{0.01})_7Sc_6Al_2O_{19}$ has been the internal substrate and $Ba_2SiO_4:Eu^{2+}$, or the objective substance, has been generated on the surface of the substrate.

Comparative Example 1

Conventional Method for Synthetizing $Ba_2SiO_4:Eu^{2+}$

Figure 5:
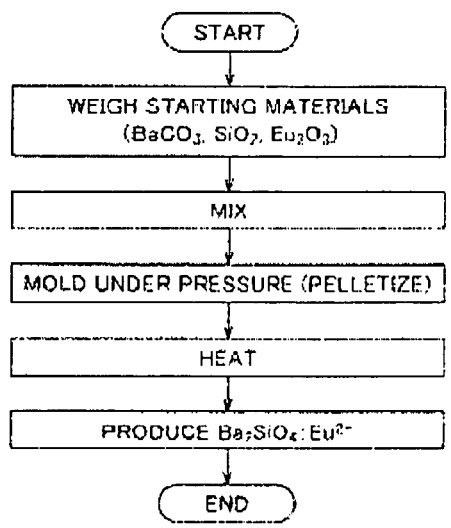
[FIG. 5] A flowchart of a manufacturing method of Comparative Example 1 (a conventional solid phase method).

As Comparative Example 1, $Ba_2SiO_4:Eu^{2+}$ was synthesized by the conventional solid phase reaction. Note that a flowchart of the manufacturing method of Comparative Example 1 is illustrated in FIG. 5. $BaCO_3$, $SiO_2$ and $Eu_2O_3$ were used as the starting materials, and the materials were each weighed out according to the stoichiometry and pulverized by acetone wet-mixing in an agate mortar, and then fired for 12 hours at 1300° C. in a weak reducing gas atmosphere of $H_2$—Ar. The firing temperature was set to 1300° C. in Comparative Example 1, since the raw material powder melted, failing to obtain the objective phosphor, when the firing temperature was set to 1500° C.

(Evaluation of Fluorescence Characteristic)

Figure 6:
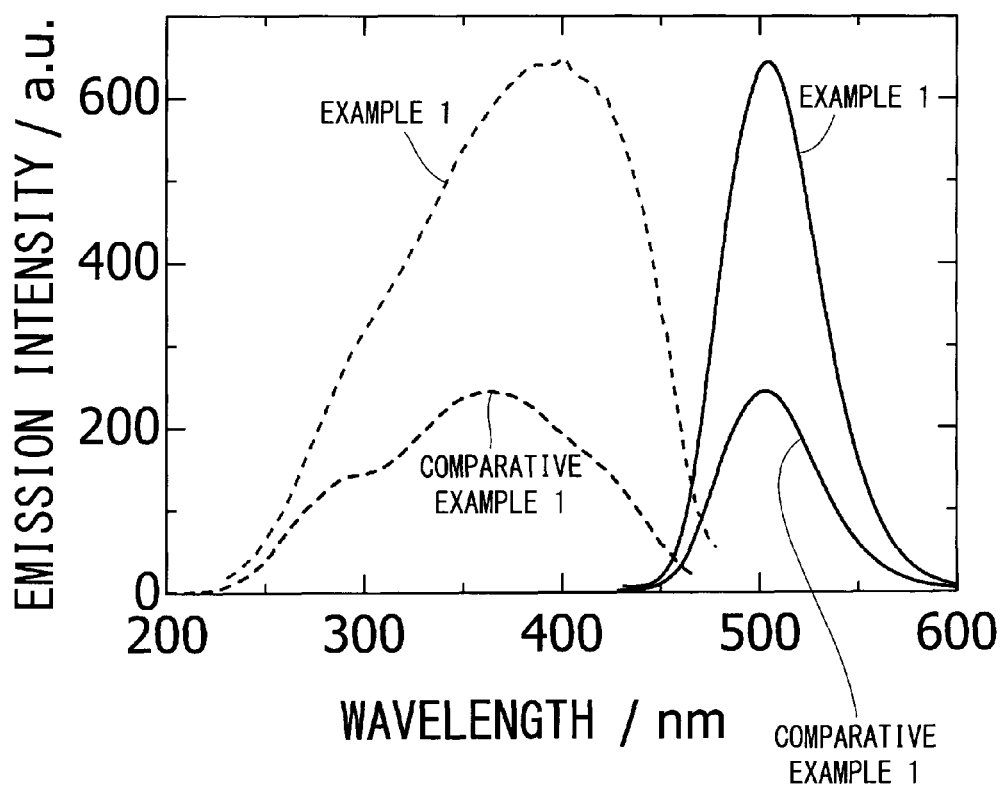
[FIG. 6] A graph of comparison between fluorescence characteristics (excitation spectra and emission spectra) of a phosphor of Example 1 and fluorescence characteristics of a phosphor of Comparative Example 1.

FIG. 6 is a graph showing comparison between the excitation and emission spectra of $Ba_2SiO_4:Eu^{2+}$ manufactured by the manufacturing method of the present invention (Example 1) and the excitation and emission spectra of $Ba_2SiO_4:Eu^{2+}$ manufactured by the conventional solid phase method (Comparative Example 1). Here, in FIG. 6, the broken lines indicate the excitation spectra of Example 1 and Comparative Example 1, and the solid lines indicate the emission spectra when excited at their optimal excitation wavelengths. Measurement of the excitation and emission spectra, a fluorescence spectrophotometer (JASCO Corporation, FP-6500) was used. Note that drawings illustrating fluorescence characteristics relating to phosphors in later-described Example 2 and Example 3 are illustrated in a similar fashion as FIG. 6 is.

Both the phosphors in Example 1 and Comparative Example 1 have excitation spectra in a very wide range of 300 nm to 450 nm. Note that the phosphor of Example 1 is strongly excited at a wavelength near 380 nm, whereas the phosphor of Comparative Example 1 is strongly excited at a wavelength near 360 nm. Here, the wavelength generally emitted from a near-ultraviolet LED ranges from 350 nm to 400 nm, and it is found that the phosphors in Example 1 and Comparative Example 1 are efficiently excited as the near-ultraviolet LEDs. Note that the reason why there was a difference in peak of the excitation spectra between Example 1 and Comparative Example 1 can be that a phosphor, having a higher concentration of $Eu^{2+}$ being the light-emitting ion, was able to be synthesized by the procedure of Example 1.

Further, both phosphors of Example 1 and Comparative Example 1 have exhibited emission spectra, having a peak near 500 nm as illustrated in FIG. 6, and have emitted green light. However, Example 1 has exhibited the emission intensity of about 2.6 times higher than the emission intensity of Comparative Example 1 when they were excited at respective optimal excitation wavelengths, and about 3.5 times higher when they were excited by a practical near-ultraviolet LED (405 nm), and thus exhibited very high values. Accordingly, it has become apparent that a silicate-based phosphor very excellent in emission intensity is provided by using the manufacturing method of the present invention.

Further, from the results of the excitation and emission spectra in FIG. 6, the phosphor of Example 1 is considered to be usable as the green phosphor of a three-wavelength white LED provided with a near-ultraviolet LED.

(Evaluation of Quantum Efficiency)

To discuss the reason why the large difference of the emission intensities was caused between the phosphor of Example 1 and the phosphor of Comparative Example 1, the quantum efficiency of each phosphor was measured using a fluorescence spectrophotometer (JASCO Corporation, FP-6500). These measurement results are shown in the following Table 1.

TABLE 1

| Sample | External quantum efficiency (%) | Sample absorption (%) | Internal quantum efficiency (%) |
|---|---|---|---|
| Example 1 | 61.30 | 76.25 | 80.39 |
| Comparative Example 1 | 43.61 | 53.73 | 81.17 |

Here, the internal quantum efficiency means the release rate to the absorbed energy. On the other hand, the external quantum efficiency means the release efficiency to the radiated energy, which is calculated by multiplying the internal quantum efficiency by the sample absorption.

The results in Table 1 show that the external quantum efficiency in Example 1 is improved by about 20% as compared to the case of Comparative Example 1. Here, it can be said that because there is no large difference between the measurement results of their internal quantum efficiencies, the difference in the sample absorptions actually affect the improvement in the external quantum efficiency in Example 1. The conceivable reasons why the sample absorption of Example 1 was improved are that the activator amount of the light-emitting ion $Eu^{2+}$ was increased, that the crystallization of the phosphor particle was improved and so on.

Figure 7:
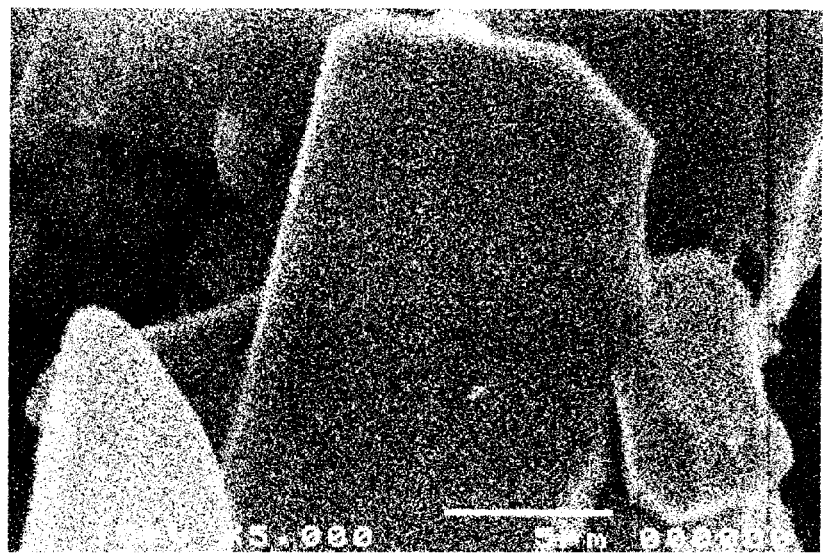
[FIG. 7] Photographs showing scanning electron microscope (SEM) images of observation at the same magnification of a phosphor surface of Example 1 and a phosphor surface of Comparative Example 1.
Figure 7:
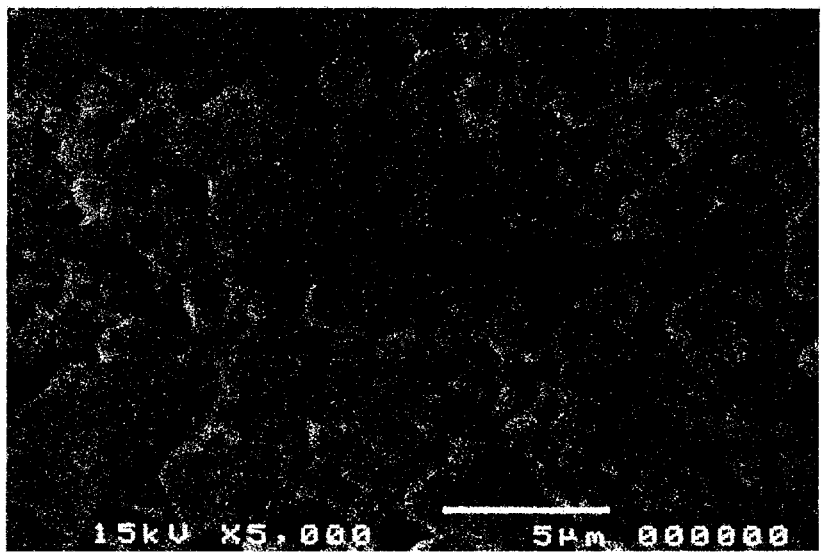

FIG. 7 shows results of observation of the phosphor surface of Example 1 and the phosphor surface of Comparative Example 1 at the same magnification by a scanning electron microscope (manufactured by Japan Electron Optics Laboratory Co., Ltd., JSM-5600). It is found that the phosphor of Example 1 is uniformly constituted of large particles having a particle diameter of about 15 μm to 20 μm as shown in FIG. 7(a), whereas the phosphor of Comparative Example 1 is constituted of small particles having non-uniform particle diameters of less than 5 μm as shown in FIG. 7(b). It is conceivable that since the method of the present invention employs the gas phase synthesis, the crystal growth of particles and the equalization of the particle size are likely to be promoted in the phosphor synthesis process. Note that it was reported in the past that the emission intensity became higher as the particle was larger. It is believed that the phosphor synthesized by the method of the present invention provides with the improved emission intensity for the above reasons.

Though $Ba_2SiO_4:Eu^{2+}$ was manufactured as the silicate-based phosphor and its emission characteristics were described in detail in the above Example 1, for example, $SrCO_3$ or the like may be added to the starting materials to manufacture $(Ba_{1-y}Sr_y)_2SiO_4:Eu^{2+}$ ($0 \leq y \leq 1$).

Further, though in Example 1, the method was employed that firstly producing the solid phase reactant having $(Ba_{0.99}Eu_{0.01})_7Sc_6Al_2O_{19}$ as a main phase by the solid phase reaction between the starting materials in the synthesis process of the phosphor, and then, producing the phosphor on a surface of the reactant, the method of the present invention is not always limited to the above. Various solid phase reactants may be produced by combination of starting materials. Further, only the silicate-based phosphor may be synthesized by the gas-solid phase reaction without producing such a solid phase reactant as in the method described in FIG. 1.

(Discussion of Firing Temperature)

Next, the condition of the firing temperature when manufacturing the silicate-based phosphor of Example 1 will be discussed. In addition of the above-described temperature condition at 1500° C., the silicate-based phosphors were manufactured also at the temperature conditions of 1400° C. and 1600° C., and their fluorescence characteristics were similarly evaluated. Note that in the cases of the firing temperatures of 1400° C. and 1600° C., the manufacturing conditions other than the firing temperature are the same as those in the case of 1500° C.

Figure 8:
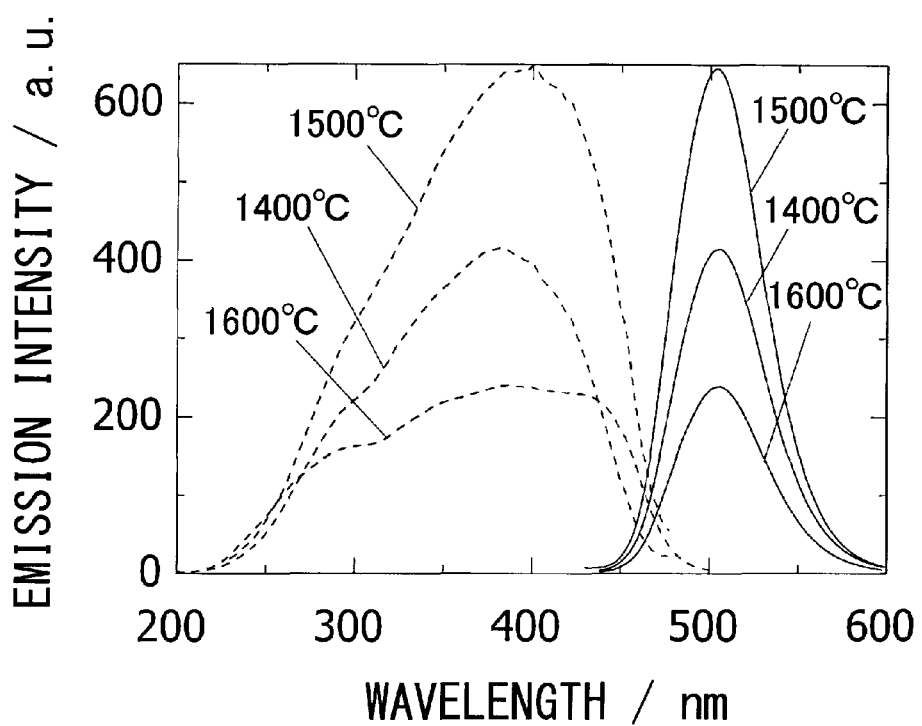
[FIG. 8] A graph showing influence of a firing temperature on fluorescence characteristics of a phosphor of Example 1.

FIG. 8 is a graph showing influence of a firing temperature on fluorescence characteristics of the phosphors of Example 1. It is found that in any cases of the firing temperature of 1400° C., 1500° C. and 1600° C., the excitation spectra and the emission spectra exhibit peaks of excitation and emission at almost the same wavelength. It is also found that the excitation intensity and the emission intensity improve in the order of 1600° C., 1400° C. and 1500° C., and thus the most excellent fluorescence characteristics are exhibited in the case of the firing temperature of 1500° C.

Figure 9:
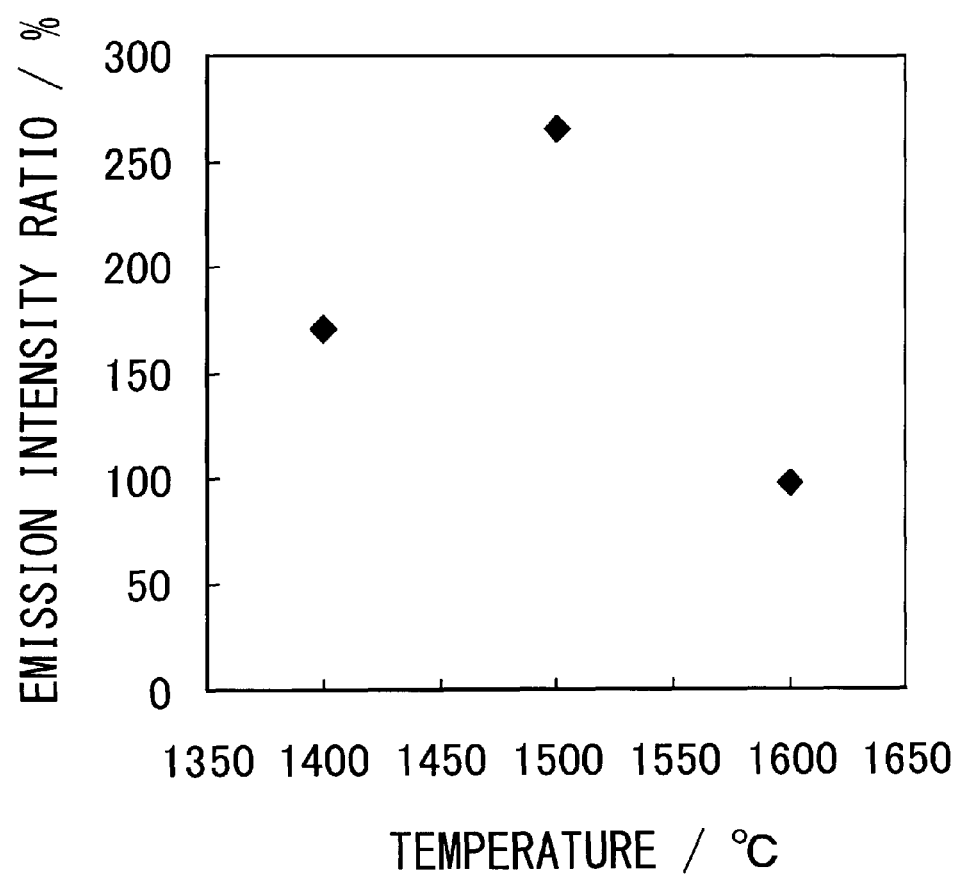
[FIG. 9] A graph of comparison between emission intensity of a sample by a solid phase method and emission intensities of samples manufactured under respective firing temperature conditions in Example 1.

FIG. 9 is a graph of comparison between emission intensity by the solid phase method as illustrated in Comparative Example 1 and emission intensities of samples manufactured under respective firing temperature conditions in Example 1. The horizontal axis in the graph indicates each firing temperature in Example 1, and the vertical axis indicates percentage values (%) (also referred to as "emission intensity ratios"), which are obtained by dividing the emission intensities of the samples in Example 1 under respective firing temperatures by the emission intensity of the sample by the solid phase method.

The emission intensity ratio for the sample fired at 1400° C. was 170% and therefore an improvement in its emission characteristics was confirmed from FIG. 9. The emission intensity ratio for the sample fired at 1500° C. was 265% and the sample shows most improved emission characteristics. On the other hand, the emission intensity ratio for the sample fired at 1600° C. was about 100% and the expected improvement in emission characteristics was not confirmed. One conceivable reason of this is that particles constituting the fired sample excessively grew. However, it was confirmed that the sample even under the temperature condition of 1600° C. had the emission characteristics equivalent to those of the sample by the solid phase method.

In the above-described Example 1, simple silicate-based (Ba—Si—O based) phosphors containing only a Ba component were used. In the later-is described Example 2 or Example 3, it will be discussed whether or not silicate-based phosphors containing a Sc component or an Al component in addition to the Ba component, can be manufactured by the gas-solid phase method of the present invention and whether or not the products thereof exhibit suitable emission characteristics. Note that as the manufacturing methods of Example 2 and Example 3, the method illustrated in FIG. 1 (the method for not producing the solid phase reactant inside the phosphor) was employed.

EXAMPLE 2

(Silicate-based Phosphor of Example 2: $Ba_9Sc_2Si_6O_{24}:Eu^{2+}$)

As the solid phase reaction raw materials of the starting materials, $BaCO_3$ (Kanto Chemical Co., Ltd., 3N), $Sc_2O_3$ (Shin-Etsu Chemical Co., Ltd., 4N), and $Eu_2O_3$ (Shin-Etsu Chemical Co., Ltd., 4N) were used. The materials were each weighed out according to stoichiometry and pulvarized by acetone wet-mixing in an agate mortar and dried. The mixed and dried solid phase reaction sample was put on a first dish (an accommodating dish made of boron nitride (BN)), and SiO being the gas phase reaction raw material was put on a second dish. These dishes were introduced in a vessel placed under an inert gas atmosphere made of only argon, and subjected to the gas-solid phase reaction by firing for 12 hours at 1600° C. Note that the second dish, on which SiO was put, was placed on the upstream side in the flow direction of the inert gas from the first dish on which the solid phase reaction sample, was put so that volatilized SiO in the gas phase was appropriately supplied to the solid phase reaction sample.

(Identification of Sample)

Figure 10:
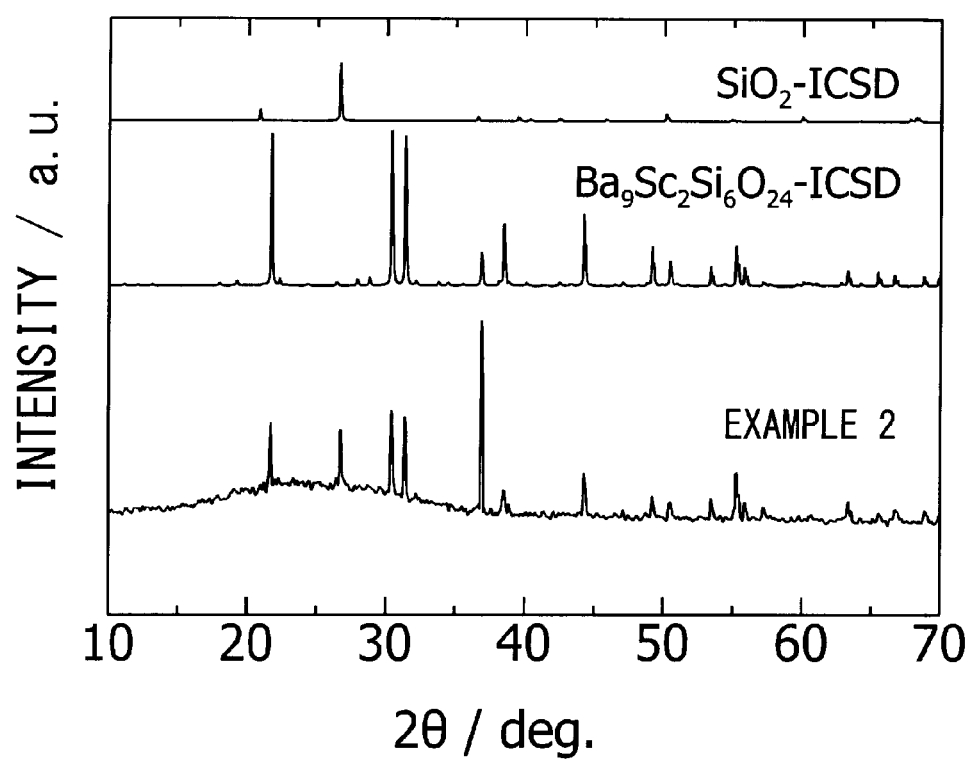
[FIG. 10] A graph showing X-ray diffraction (XRD) measurement results of a phosphor of Example 2.

Identification of the sample using a powder X-ray diffractometer (manufactured by Mac Science Ltd. MX-Labo) was performed as in Example 1. FIG. 10 shows X-ray diffraction (XRD) measurement results of a sample manufactured by Example 2. Here, the result at the lower stage shows an XRD pattern of the sample (Example 2). On the other hand, the results at the upper stage and the middle stage show XRD patterns of $SiO_2$ and $Ba_9Sc_2Si_6O_{24}$, respectively, acquired from the inorganic crystal structure database (ICSD) provided by Japan Association for International Chemical Information (JAICI).

The XRD pattern at the lower stage in FIG. 10 substantially well coincided with and corresponded to the XRD pattern at the middle stage which was a specimen, thereby proving that $Ba_9Sc_2Si_6O_{24}:Eu^{2+}$ being the objective substance was generated. Further, the XRD pattern at the lower stage has peaks corresponding to those of the XRD pattern at the upper stage, thereby showing that a small amount of $SiO_2$ is mixed as an impurity in addition to the objective substance. It is conceivable that this is because SiO supplied in the gas phase was oxidized. Note that $SiO_2$ does not affect the emission characteristics of the phosphor.

(Evaluation of Fluorescence Characteristics)

Figure 11:
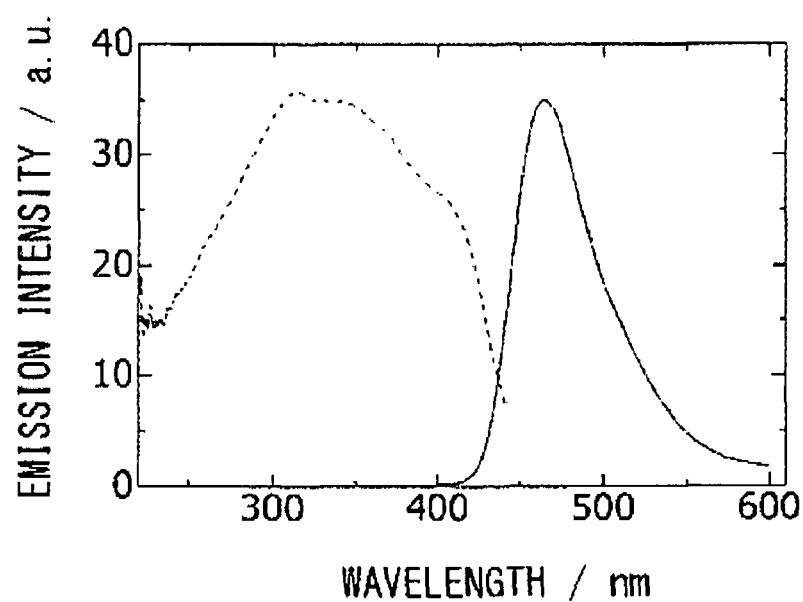
[FIG. 11] A graph showing fluorescence characteristics of a phosphor of Example 2.

FIG. 11 is a graph showing fluorescence characteristics of $Ba_9Sc_2Si_6O_{24}:Eu^{2+}$ manufactured by Example 2. The phosphor of Example 2 exhibited wide excitation spectra having a peak near 300 nm and emission spectra having a peak near 460 nm to emit blue light. It was confirmed that the fluorescence characteristics shown in FIG. 11 well coincided with the already-known fluorescence characteristics (not illustrated) of $Ba_9Sc_2Si_6O_{24}:Eu^{2+}$ obtained by the conventional solid phase method. Note that the aforementioned phosphor obtained by the conventional solid phase method sometimes emits blue light and sometimes emits green light depending on the manufacturing condition and the like.

EXAMPLE 3

(Silicate-based Phosphor of Example 3: $BaAl_2Si_2O_8:Eu^{2+}$)

As the solid phase reaction raw materials of the starting materials, $BaCO_3$ (Kanto Chemical Co., Ltd., 3N), $Al_2O_3$ (Kojundo Chemical Laboratory, 4N), and $Eu_2O_3$ (Shin-Etsu Chemical Co., Ltd., 4N) were used. The conditions of the mixing method, the firing method and so on are the same as those in Example 2 and therefore the description thereof are omitted here.

(Identification of Sample)

Figure 12:
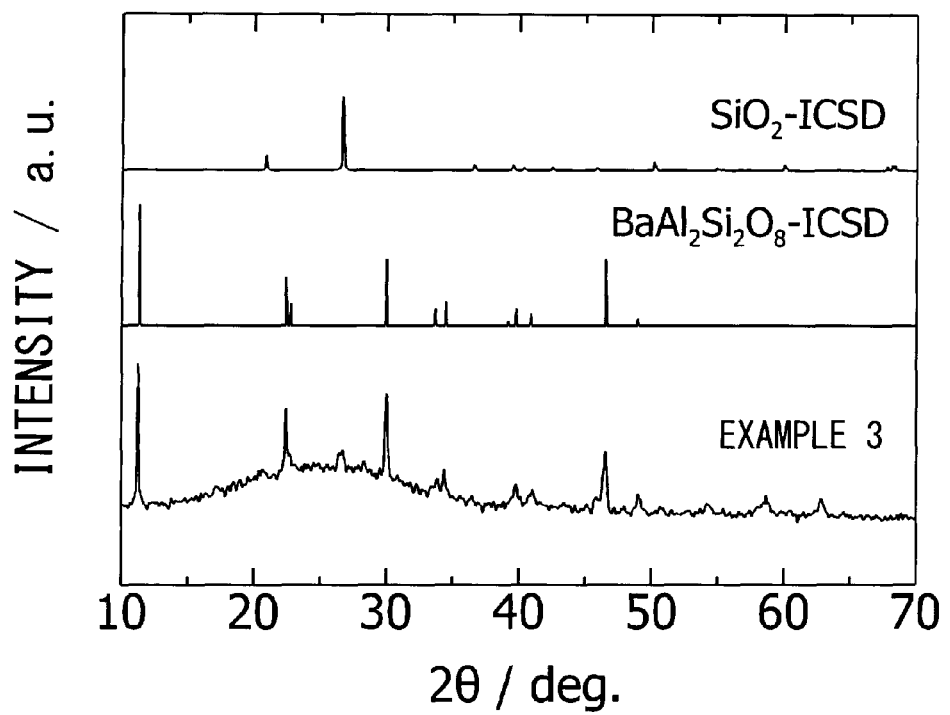
[FIG. 12] A graph showing X-ray diffraction (XRD) measurement results of a phosphor of Example 3.

FIG. 12 shows X-ray diffraction (XRD) measurement results of a sample manufactured by Example 3. Here, the result at the lower stage shows an XRD pattern of the sample (Example 3). On the other hand, the results at the upper stage and the middle stage show XRD patterns of $SiO_2$ and $BaAl_2Si_2O_8$ respectively, acquired from the inorganic crystal structure database (ICSD) provided by Japan Association for International Chemical Information (JAICI).

The XRD pattern at the lower stage in FIG. 12 substantially well coincided with and corresponded to the XRD pattern at the middle stage which was the specimen, thereby proving that $BaAl_2Si_2O_8:Eu^{2+}$ being the objective substance was generated. Note that the XRD pattern at the lower stage has, as in the XRD result of Example 2, peaks corresponding to those of the XRD pattern at the upper stage, thereby showing that a small amount of $SiO_2$ is mixed as an impurity in addition to the objective substance.

(Evaluation of Fluorescence Characteristics)

Figure 13:
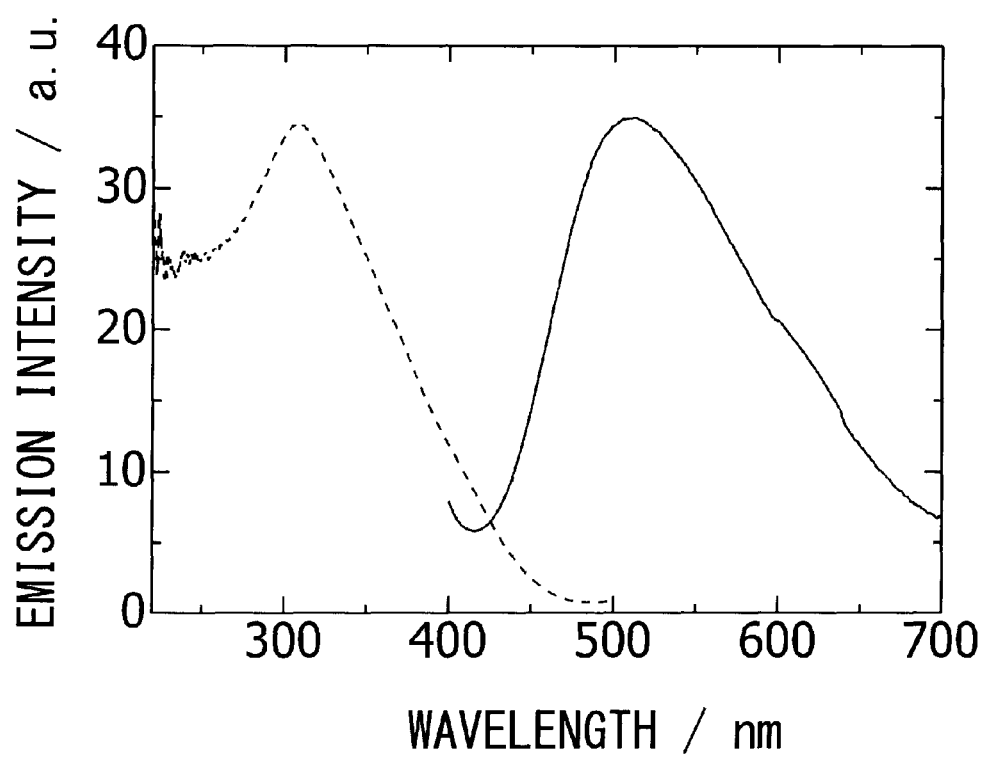
[FIG. 13] A graph showing fluorescence characteristics of a phosphor of Example 3.

FIG. 13 is a graph showing fluorescence characteristics of $BaAl_2Si_2O_8:Eu^{2+}$ manufactured by Example 3. The phosphor of Example 3 exhibited wide excitation spectra having a peak near 310 nm and emission spectra having a peak near 510 nm to emit green light.

From the above result of Example 3, it was found that $BaAl_2Si_2O_8:Eu^{2+}$ being the objective substance was able to be synthesized and caused to emit light by the gas-solid phase method of the present invention.

Further, the phosphors manufactured by the present invention are not always limited to those phosphors without departing from the spirit of the invention in the above-described novel synthesis method.

Industrial Availability

By using the silicate-based phosphor manufactured by the present invention, for example, as the phosphor of a three-wavelength white LED, a white LED can be provided which provides light closer to natural light and drastically improves in luminance.

Further, the silicate-based phosphor manufactured by the present invention is applicable not only to the white LED but also to wide range of usage such as display devices with a display panel such as a CRT, PDP, FED and the like, illumination apparatuses such as a fluorescent lamp and the like.

| Explanation of Codes | |
|---|---|
| 1 | phosphor manufacturing apparatus |
| 2 | vessel |
| 2a | horizontal plane in vessel |
| 3 | raw material powders containing a compound containing light-emitting ions (solid phase reaction raw materials) |
| 4 | $SiO_x$ in solid state (gas phase reaction raw material) |
| 5 | first dish |
| 6 | second dish |
| 7a | gas supply port |
| 7b | gas exhaust port |
| 8 | $SiO_x$ in gas phase |

The invention claimed is:

1. A manufacturing method of a silicate-based phosphor, comprising:
   introducing in a vessel raw material powders having a compound containing light-emitting ions selected from at least one of Eu, Ce, Mn, and Tb; and
   firing the raw material powders while supplying $SiO_x$ ($0.5 \leq x \leq 1.9$) in a gas phase,
   wherein the raw material powers are a mixture further containing at least one of an alkali metal compound, an alkaline-earth metal compound, a magnesium compound, and a rare-earth compound,
   the silicate-base phosphor is $M_2SiO_4:Eu^{2+}$, and
   M is one or more selected from a group consisting of Ca, Sr and Ba.

2. The manufacturing method of a silicate-based phosphor according to claim 1,
   wherein the range for x of the $SiO_x$ is $0.8 \leq x \leq 1.2$.

3. The manufacturing method of a silicate-based phosphor according to claim 1,
   wherein the firing is performed by supplying the $SiO_x$ to the raw material powders in a gas atmosphere at a temperature of 1200 to 1700° C. and subjecting the raw material powders to a gas-solid phase reaction at a temperature of 700 to 1700° C.

4. The manufacturing method of a silicate-based phosphor according to claim 3,
   wherein the gas atmosphere is a reducing gas atmosphere.

* * * * *